(12) United States Patent
Sherwood

(10) Patent No.: US 11,371,233 B1
(45) Date of Patent: Jun. 28, 2022

(54) TURF COVER AND EMITTER FOR A WATER DRAINAGE SYSTEM

(71) Applicant: Robert Sherwood, Almont, MI (US)

(72) Inventor: Robert Sherwood, Almont, MI (US)

( * ) Notice: Subject to any disclaimer, the term of this patent is extended or adjusted under 35 U.S.C. 154(b) by 0 days.

(21) Appl. No.: 17/591,037

(22) Filed: Feb. 2, 2022

Related U.S. Application Data

(63) Continuation of application No. 17/580,267, filed on Jan. 20, 2022, now abandoned.

(51) Int. Cl.
| | |
|---|---|
| *E03F 5/12* | (2006.01) |
| *E03F 5/04* | (2006.01) |
| *E03F 1/00* | (2006.01) |
| *E01C 13/08* | (2006.01) |
| *E02B 11/00* | (2006.01) |

(52) U.S. Cl.
CPC .............. *E03F 5/04* (2013.01); *E01C 13/083* (2013.01); *E02B 11/005* (2013.01); *E03F 1/00* (2013.01); *E03F 5/125* (2013.01)

(58) Field of Classification Search
CPC ..... E03F 1/00; E03F 1/002; E03F 5/04; E03F 5/042; E03F 5/12; E03F 1/125; E03F 5/125; E01C 13/02; E01C 13/083; E02B 11/005; E04D 13/08
USPC .... 210/163, 164, 170.03, 747.3; 405/36, 41, 405/42; 52/16
See application file for complete search history.

(56) References Cited

U.S. PATENT DOCUMENTS

| | | | | |
|---|---|---|---|---|
| 1,541,436 | A * | 6/1925 | Reshan ................... | E02D 29/14 210/163 |
| 2,003,770 | A * | 6/1935 | Goodhart ................ | E03F 5/042 210/163 |
| 4,475,571 | A * | 10/1984 | Houston, Jr. ............ | E03F 5/12 137/445 |
| 4,850,059 | A * | 7/1989 | Dickerson ................ | E03F 5/12 4/219 |
| 5,864,990 | A * | 2/1999 | Tu ............................ | E03F 5/06 210/163 |
| 2010/0206792 | A1* | 8/2010 | Stradley .................. | E03F 1/002 210/163 |
| 2010/0322711 | A1* | 12/2010 | Frost ....................... | E03F 1/005 405/36 |
| 2011/0139694 | A1* | 6/2011 | Mondschein .......... | E03F 5/0404 210/163 |
| 2015/0345125 | A1* | 12/2015 | Gazlay .................... | E03F 5/0401 210/163 |
| 2018/0080229 | A1* | 3/2018 | Kunz ....................... | E04D 13/08 |

* cited by examiner

*Primary Examiner* — Christopher Upton
(74) *Attorney, Agent, or Firm* — Brooks Kushman P.C.

(57) ABSTRACT

A pop-up emitter includes a conduit, a cover plate, a pop-up lid, and a clip. The conduit defines a flow channel configured to establish fluid communication with a drainage system. The cover plate protrudes radially outward from a top end of the conduit and about the flow channel. The cover plate defines a slot along a top surface of the cover plate. The pop-up lid has a horizontally extending pin protruding outward therefrom. The pin is disposed within the slot. The pop-up lid is configured to pivot about the pin to transition between a first position where the plate covers the flow channel along the top end and a second position where the flow channel is exposed such that water is emitted therefrom. The clip is disposed within the slot and engages the pin such that the clip retains the pin within the slot.

20 Claims, 7 Drawing Sheets

TURF COVER AND EMITTER FOR A WATER DRAINAGE SYSTEM

CROSS-REFERENCE TO RELATED APPLICATIONS

This application is a continuation of U.S. application Ser. No. 17/580,267 filed Jan. 20, 2022, the disclosure of which is hereby incorporated in its entirety by reference herein.

TECHNICAL FIELD

The present disclosure relates to water drainage systems, particularly to water drainage systems for buildings and houses.

BACKGROUND

Runoff water may be directed away from buildings and houses via water drainages systems.

SUMMARY

A pop-up emitter for a water drainage system includes a turf cover, a lid, and a clip. The turf cover defines a central orifice that is configured to establish fluid communication with a drainage conduit that is disposed below the pop-up drain emitter. The turf cover further defines a slot extending downward from a top surface of the turf cover. The lid has a plate disposed over the central orifice along the top surface of the turf cover. The lid also includes a pin protruding outward from the plate. The pin is disposed within a first portion the slot. The plate is configured to pivot about the pin to transition between a closed position where the plate covers the central orifice and an open position where the central orifice is exposed such that water is emitted therefrom. The clip is secured to the turf cover and is disposed within a second portion of the slot such that the clip retains the pin within the first portion of the slot.

A pop-up emitter includes a conduit, a cover plate, a pop-up lid, and a clip. The conduit defines a flow channel configured to establish fluid communication with a drainage system. The cover plate protrudes radially outward from a top end of the conduit and about the flow channel. The cover plate defines a slot along a top surface of the cover plate. The pop-up lid has a horizontally extending pin protruding outward therefrom. The pin is disposed within the slot. The pop-up lid is configured to pivot about the pin to transition between a first position where the plate covers the flow channel along the top end and a second position where the flow channel is exposed such that water is emitted therefrom. The clip is disposed within the slot and engages the pin such that the clip retains the pin within the slot.

A pop-up emitter kit includes a turf cover, a lid, a clip, and a grate. The turf cover defines a central orifice, defines a slot extending downward from a top surface of the turf cover, and has a rim that extends about the outer periphery of the central orifice. The rim is recessed from an upper surface of the turf cover. The lid has a pin protruding outward therefrom. The pin is configured to be disposed within a first portion of the slot. The lid is configured to engage the rim and cover the central orifice when in a closed position. The lid is configured to rotate via the pin from the closed position to an open position such that the lid disengages the rim and exposes the central orifice so that water is emitted therefrom. The clip is configured to be disposed within a second portion of the slot and engage the pin to retain the pin within the first portion of the slot. The grate is interchangeable with the lid and is configured to engage the rim to cover the central orifice.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
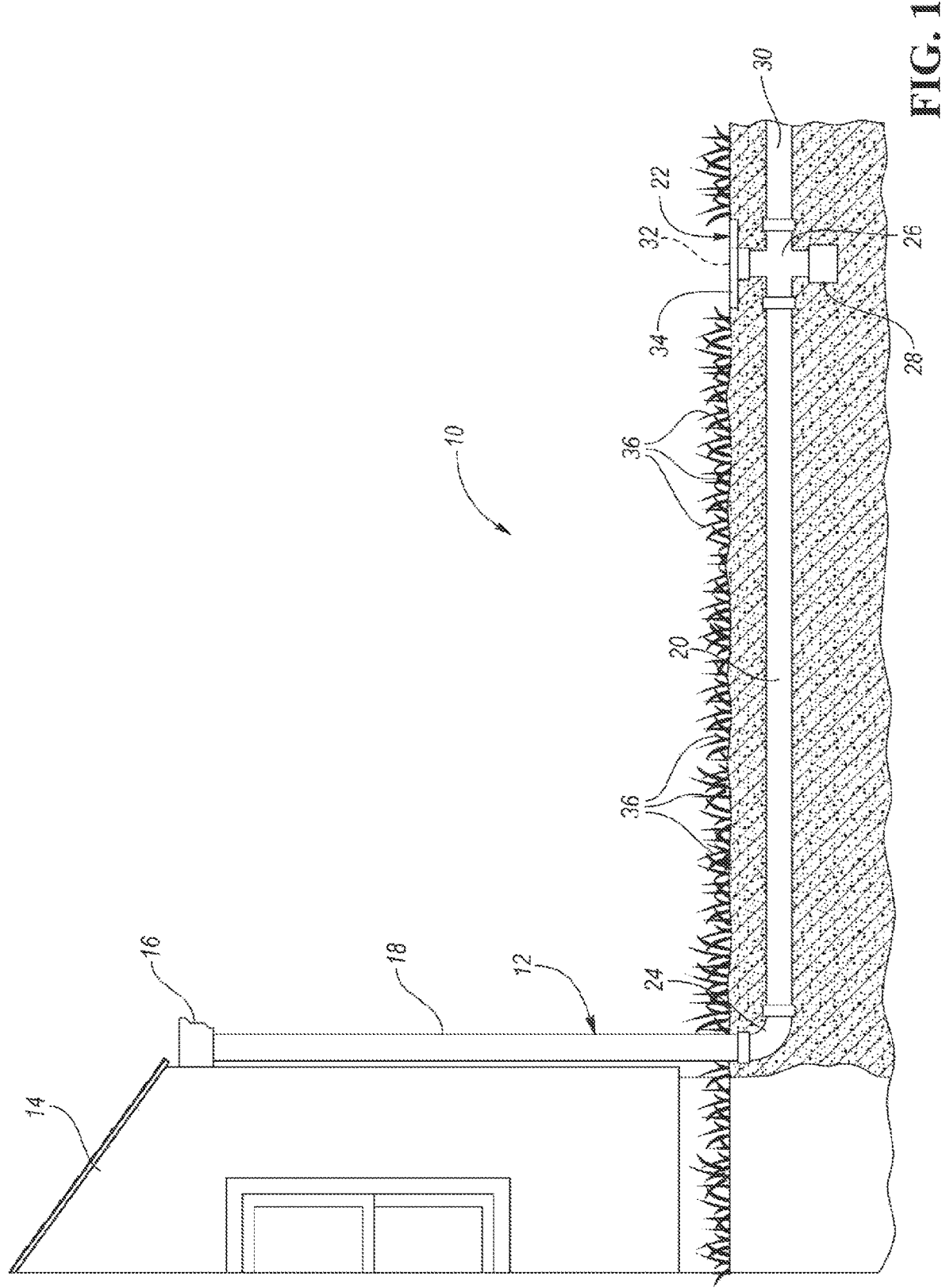
FIG. 1 is a front view of a water drainage systems for a building or house.
Figure 2:
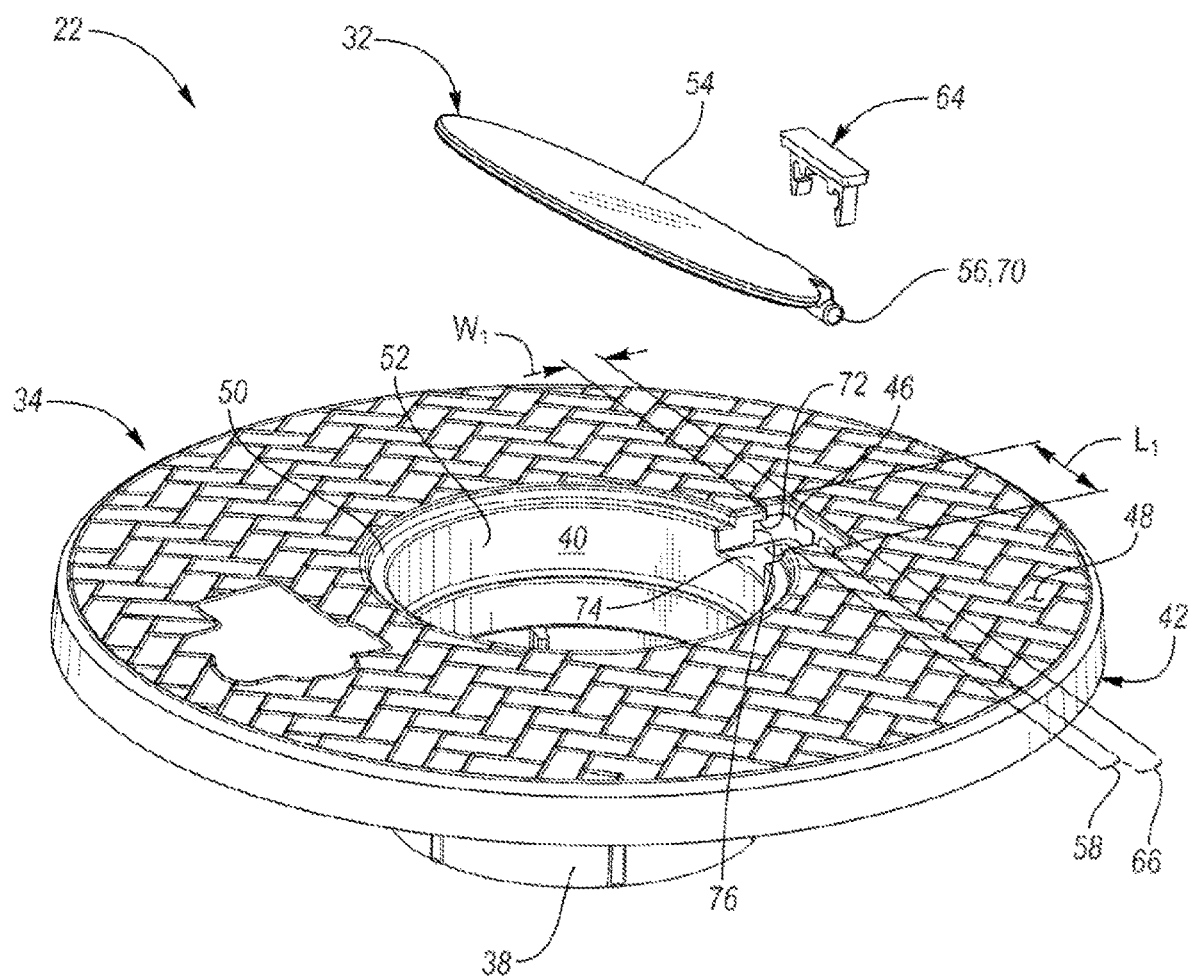
FIG. 2 is an isometric exploded view of a pop-up emitter that is connected to the water drainage system.
Figure 3:
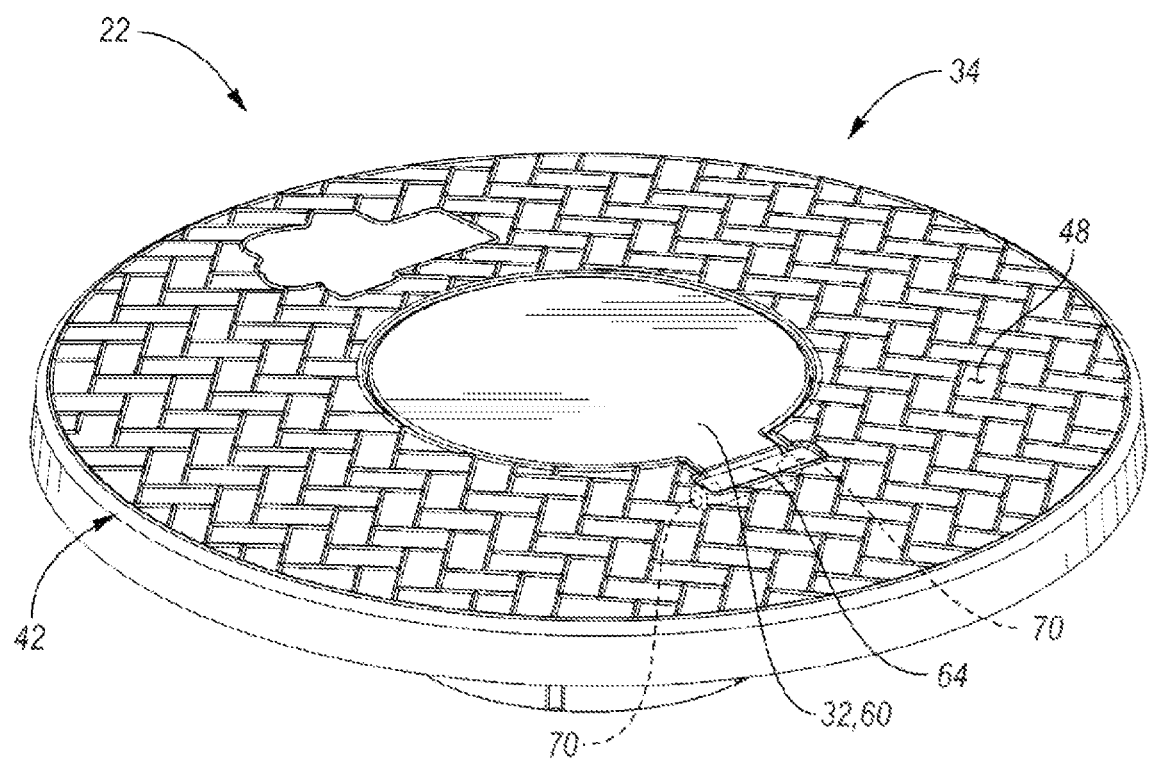
FIG. 3 is a top isometric view of the pop-up emitter with a lid of the of the pop-up emitter in a closed position.
Figure 4:
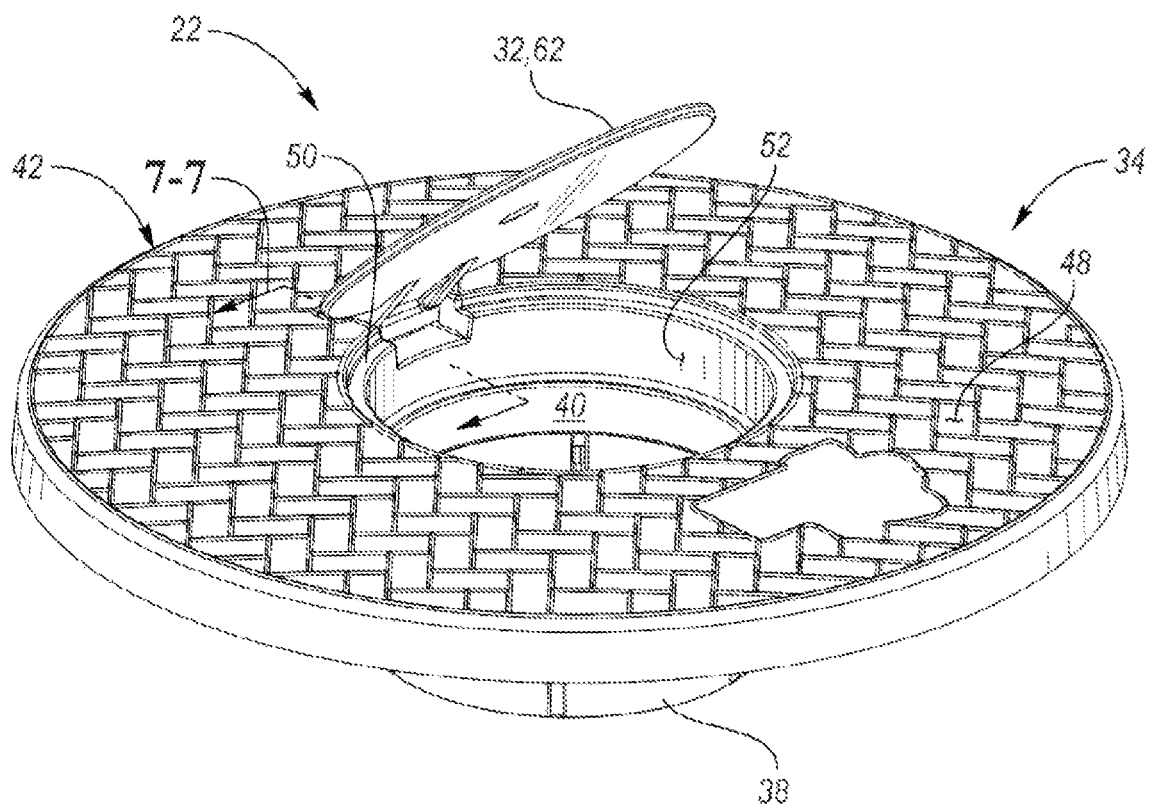
FIG. 4 is a top isometric view of the pop-up emitter with the lid of the of the pop-up emitter in an open position.
Figure 5:
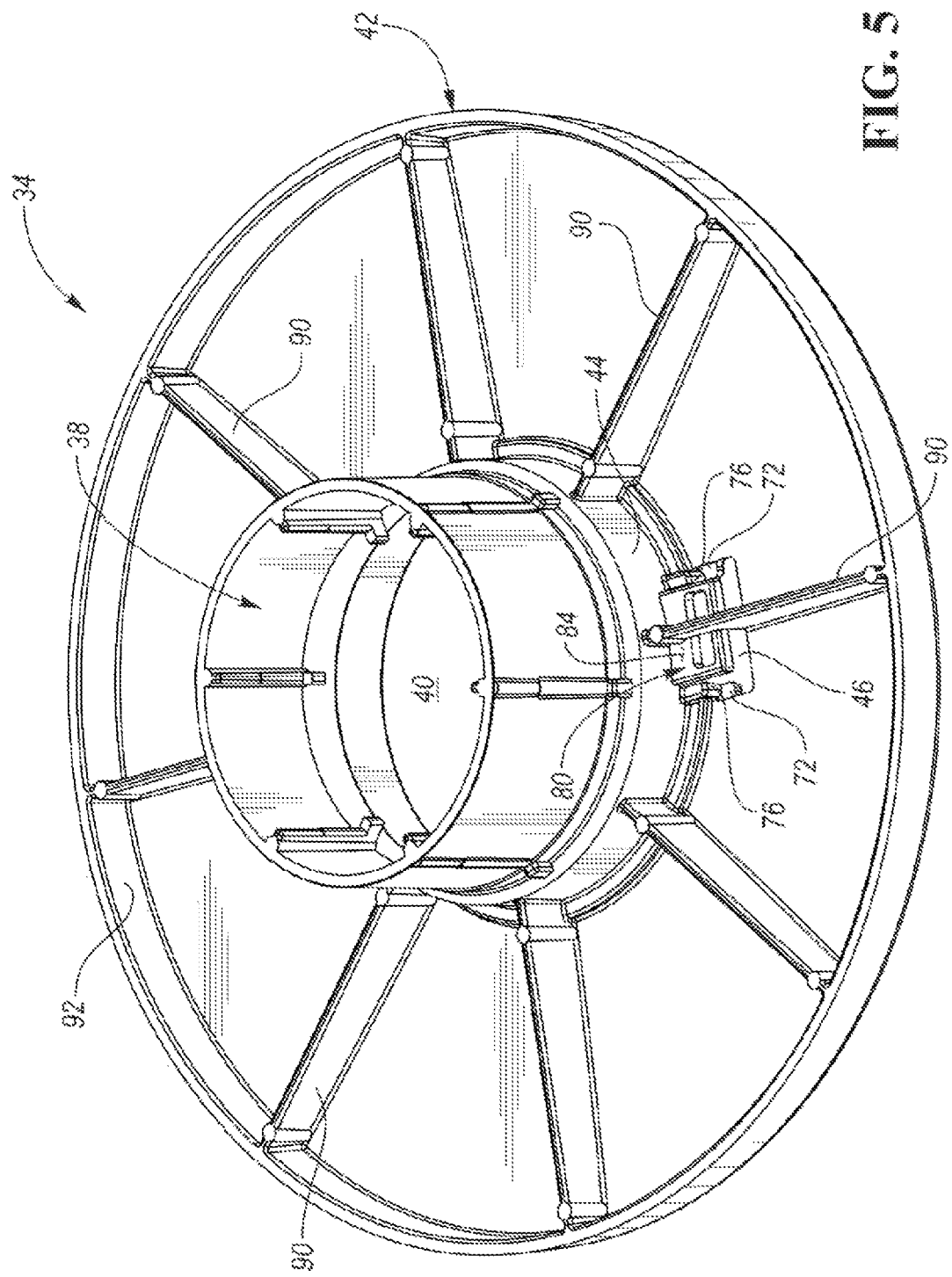
FIG. 5 is a bottom isometric view of a turf cover that forms a portion of the pop-up emitter.
Figure 6:
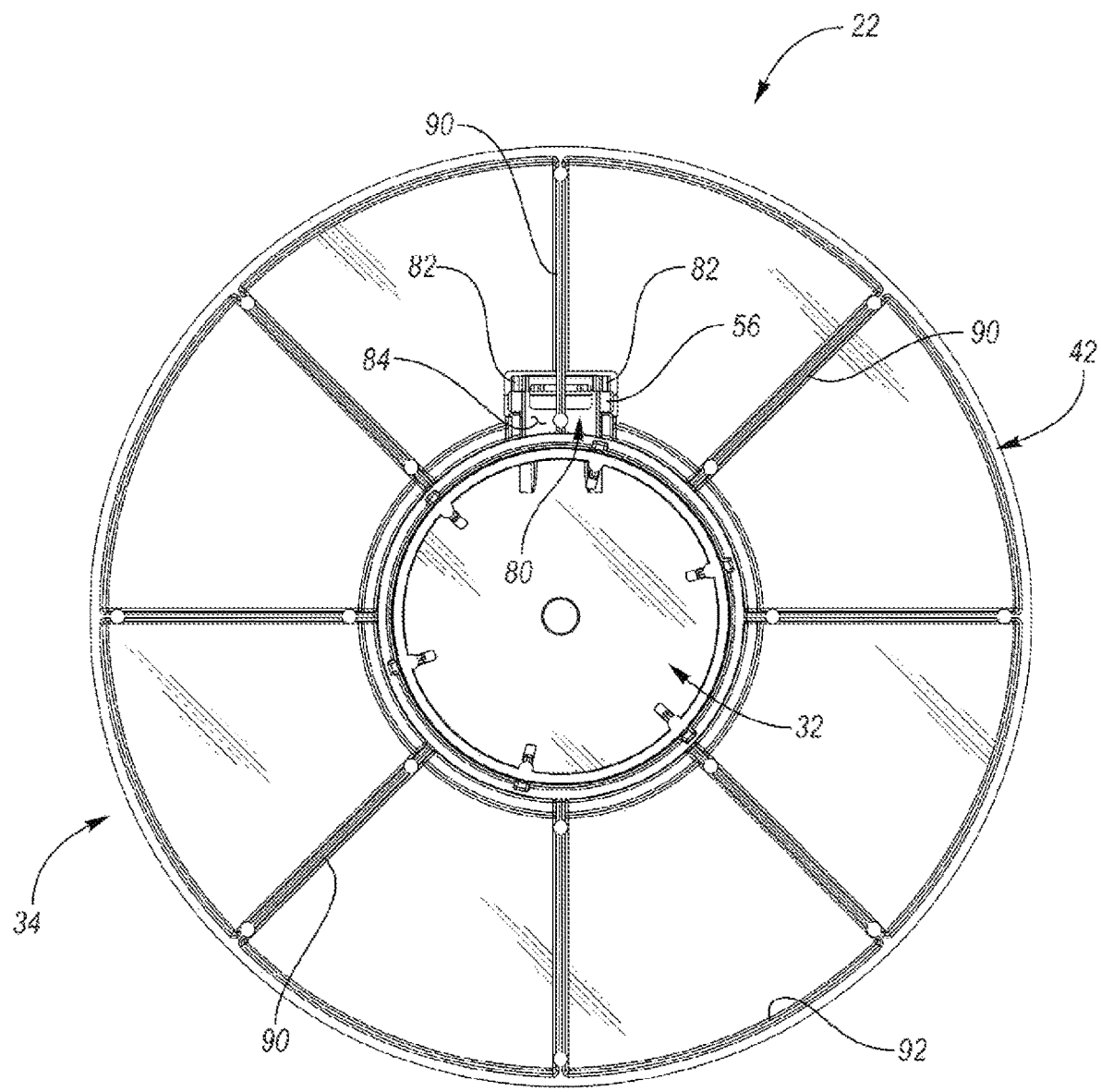
FIG. 6 is a bottom view of the pop-up emitter.
Figure 7:
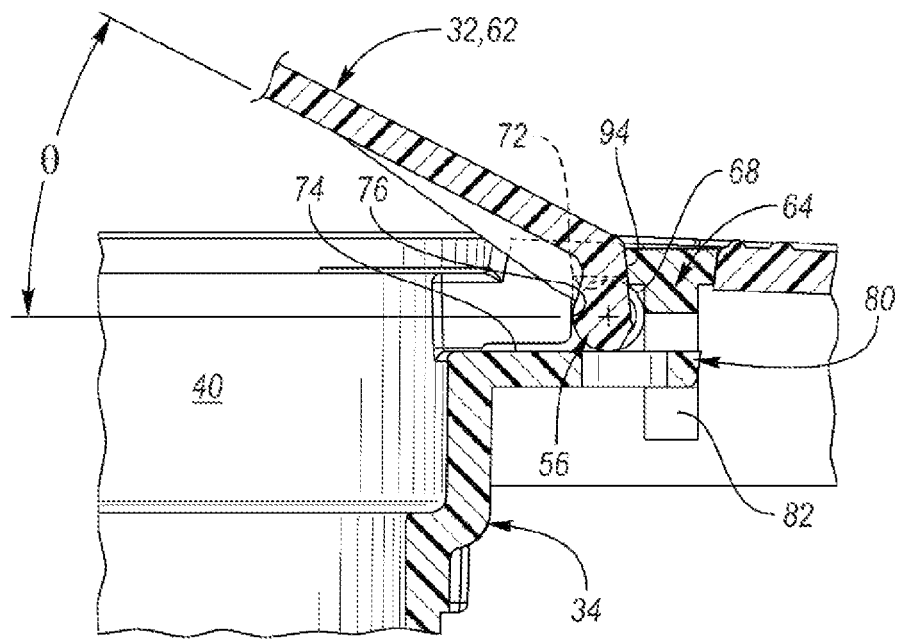
FIG. 7 is a cross-section view taken along line 7-7 in FIG. 4.
Figure 8:
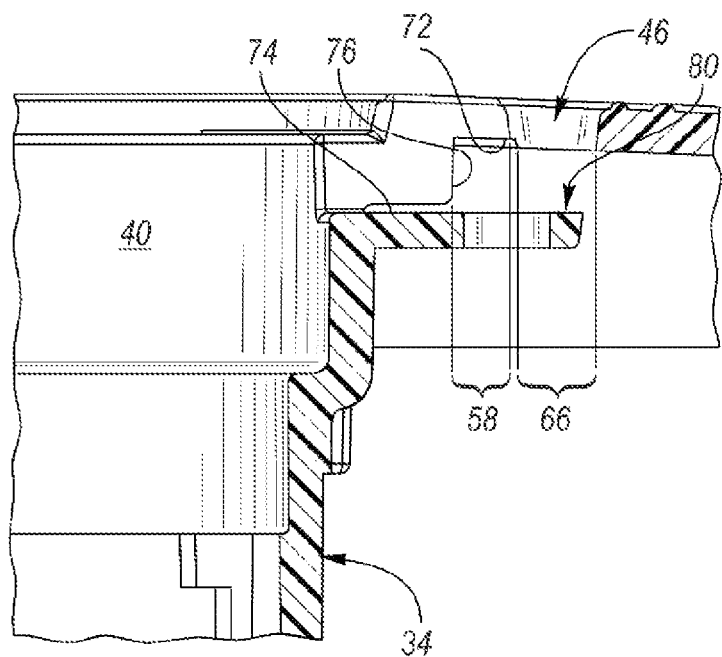
FIG. 8 is a cross-sectional view taken along line 7-7 in FIG. 4 with the lid and a retaining clip removed.
Figure 9:
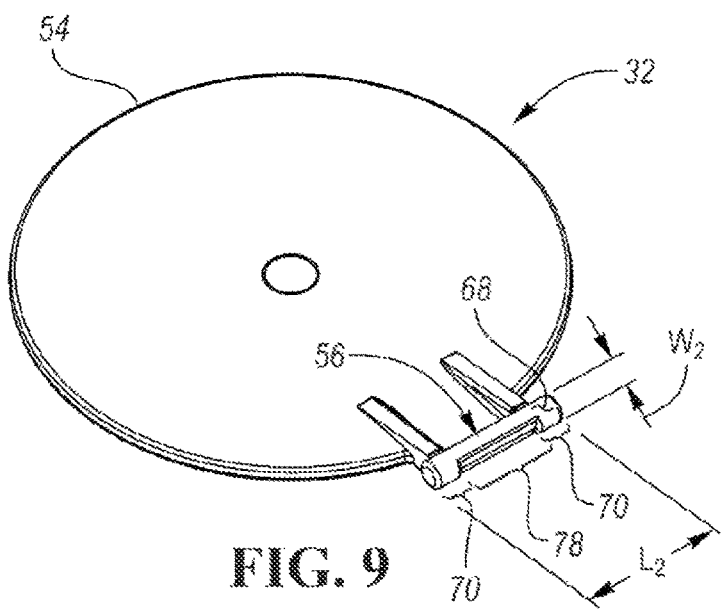
FIG. 9 is a bottom isometric view of the lid.
Figure 10:
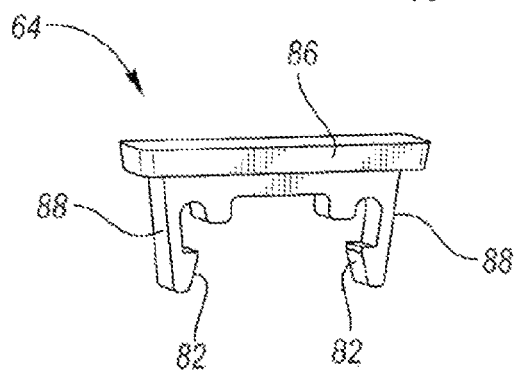
FIG. 10 is a front isometric view of the retaining clip.

Referring to FIG. 1, a water drainage system 10 is illustrated. The water drainage system 10 may specifically be designed to direct water away from a house or building in order to prevent runoff water from the house or building from flooding the lower level (e.g., the basement) of the house or building. It should be understood, however, that the water drainage system 10 may be utilized in other scenarios and should not be construed as limited to a water drainage system that is configured to direct water away from a house or building. For example, the water drainage system could be utilized to direct water away from a field, such as an athletic field, or a paved surface, such as a road or parking lot. The water drainage system 10 may be further comprised to direct water toward a storm drain system, and more specifically toward a catch basin of a storm drain system.

As illustrated in FIG. 1, the water drainage system 10 includes tubes, pipes, or conduits 12 that are configured to direct water away from a house or building 14. More specifically, the conduits 12 may be configured to direct water away from an eavestrough 16 that is disposed along edges of a roof of the building 14. The eavestrough 16 is configured to collect runoff water that cascades down the roof of the building 14 during rainstorms, from melting snow, or from any other source. The conduits 12 are configured to direct the water away from the eavestrough 16 and away from the building 14.

The tubes, pipes, or conduits 12 of the water drainage system 10 may include a downspout 18 that is configured to direct water downward from the eavestrough 16 to a horizontal tube, pipe, or conduit 20. The horizontal conduit 20 in turn may be configured to direct water from the downspout 18 to a pop-up drain emitter 22 that is connected to the water drainage system 10. The pop-up drain emitter 22 may be referred to as the pop-up emitter 22. The horizontal conduit 20 may include a slight downward slope extending in a direction from the downspout 18 to the pop-up emitter 22 such that water flows from the downspout 18 to the pop-up emitter 22. The downspout 18 may be connected to the horizontal conduit 18 via a first elbow tube, pipe, or conduit 24. The horizontal tube 20 and the first elbow conduit 24 may be disposed or buried underground, which may be for aesthetic purposes or may be to prevent placing an obstacle on an area of ground that may require maintenance (e.g., the area of ground may include grass that needs to be mowed on a regular basis) or that may have a significant amount of foot traffic.

The pop-up emitter 22 may be connected to the horizontal tube 20 via a four-way fitting 26. The horizontal tube 20 may be connected to a first side of the four-way fitting 26 while the pop-up emitter 22 is connected to a top side of the four-way fitting 26. A closed-ended tube or catch basin 28 may be secured to a bottom side of the four-way fitting 26. The catch basin 28 may also be referred to as a distribution box. The catch basin 28 may be configured to catch debris that has entered the water drainage system 10, such as pebbles from roofing shingles. A second side of the four-way fitting 26 may be connected to a second horizontal tube 30. Water may flow from the horizontal tube 20 and into the catch basin 28 and/or out of the pop-up emitter 22 via the four-way fitting 26. Water flow may flow out of the catch basin 28 and the four-way fitting 26 via the second horizontal tube 30 or pop-up emitter 22. Alternatively, the second side of the four-way fitting 26 may be connected to a plug such that water can only flow out of the four-way fitting via the pop-up emitter 22.

In another alternative, a second elbow tube, pipe, or conduit that bends upward from the horizontal tube 20 may connect the horizontal tube 20 to the pop-up emitter 22 such that water can only flow out of the horizontal tube 20 via the pop-up emitter 22. In embodiments where water can only flow out of the water drainage system via the pop-up emitter 22, the pop-up emitter 22 may be positioned proximate to a catch basin of a storm drain system so that the water flowing out of the pop-up emitter 22 is directed to the catch basin of the storm drain system.

The pop-up emitter 22 may have a pop-up lid or lid 32 that is configured to transition between a retracted or closed position, where the lid 32 is approximately flush or slightly above the upper surface of the ground, and an advanced or opened position, where the lid 32 is above the upper surface the ground. In the retracted or closed position, the lid 32 is positioned to be below and out the way of any yard maintenance tools or machinery, particular the rotating blade of a lawnmower. In the advanced or opened position, the lid 32 transitions away from an opening or orifice defined by the pop-up emitter 22 (the opening or orifice being in fluid communication with the four-way fitting 26 or second elbow conduit) such that water is able to flow out of the opening or orifice defined by the pop-up emitter 22. In the retracted or closed position, the lid 32 is configured to rest upon a seat or rim defined by the pop-up emitter 22 such that the lid 32 covers the opening or orifice defined by the pop-up emitter 22.

A turf cover 34 may be disposed radially about the lid 32. The turf cover 34 is configured to engage the ground to inhibit vegetative growth (e.g., grass 36) proximate to and radially about an outer periphery of the lid 32. More specifically, the turf cover 34 may cover the ground such that sunlight is unable to penetrate the ground directly below the turf cover 34, which inhibits the vegetative growth. The lid 32 and the turf cover 34 may both be green in color in order to blend in with the adjacent vegetation, or more specifically with the adjacent grass, which may be for aesthetic purposes.

As previously stated, the conduits 12 may be configured to direct water away from any source, and this disclosure should not be construed as limited to the layout of conduits 12 in FIG. 1. For example, the first elbow conduit 24 is illustrated as a 90° elbow (i.e., an elbow pipe that turns at about a 90° angle). However, the first elbow conduit 24 may be reconfigured as an elbow that turns at any desirable angle (e.g., a 60°, 45°, or 22.5° elbow). Also, and as previously stated, it may be desirable to reconfigure the four-way fitting 26 as a second elbow conduit (e.g., a 90°, 60°, 45°, or 22.5° elbow). Such adjustments may be desirable in the event that ground at which the water drainage system 10 is disposed has slope or grade that is not a flat 0° slope or grade.

Referring to FIGS. 2-10, the pop-up emitter 22 and the various components of the pop-up emitter 22, such as the turf cover 34 and the lid 32, are illustrated in further detail. The turf cover 34 includes a tube, pipe, or conduit 38 that defines a flow channel or central orifice 40. The central orifice 40 is configured to establish fluid communication with the drainage system 10. More specifically, the central orifice 40 is configured to establish fluid communication with portions of the drainage system 10 that are disposed below the pop-up emitter 22, such as the horizontal tube 20 or four-way fitting 26.

The turf cover 34 further includes a cover plate 42. The cover plate 42 protrudes radially outward from a top end 44 of the conduit 38. The cover plate 42 also extends about or around the central orifice 40. It may be stated that the cover plate 42 defines an upper portion of the central orifice 40. It may also be stated that the turf cover 34, which includes the conduit 40 and cover plate 42, defines the central orifice 40. The turf cover 34 defines a slot 46 along an upper or top surface 48 of the turf cover 34. More specifically, the cover plate 42 may define the slot 46 and the top surface 48 may be the top surface of the cover plate 42. The slot 46 may extend downward from the top surface 48. The turf cover 34, or more specifically the cover plate 42, may have a rim 50 that the extends about or around an outer periphery 52 of the central orifice 40. The rim 50 may be recessed downward from the upper surface 48.

The cover plate 42 may more specifically be configured to engage the ground to inhibit vegetative growth (e.g., grass 36) proximate to and radially about an outer periphery of the lid 32. The top surface 48 may be textured or knurled in order to increase friction between the top surface 48 and an object that is contacting the top surface 48, such as the shoe of someone stepping on the top surface 48 or a lawnmower wheel that is rolling over the top surface 48.

The lid 32 has a plate 54 that is disposed over the central orifice 40 along the top surface 48. The lid 32 also has a pin 56 protruding outward from the plate 54. The pin 56 may extend horizontally once installed onto the turf cover 34. The pin 56 is disposed within a first portion 58 the slot 46. The plate 54 is configured to pivot about the pin 56 to transition between a closed position 60 where the plate 54 covers the central orifice 40 and an open position 62 where the central orifice 40 is exposed such that water may be emitted from the central orifice 40. In the closed position, the plate 54 covers the central orifice 40 along top end 44 of the conduit 38 (i.e., where the cover plate 42 protrudes radially outward from the conduit 38). The lid 32, or more specifically the plate 54 is configured to engage the rim 50 and cover the central orifice 40 in the closed position 60 The lid 32 may be flush with the top surface 48 when in the closed position 60. The lid disengages the rim 50 when transitioned to the open position 62 so that the central orifice 40 is exposed such that water may be emitted from the central orifice 40.

When water is moving through the water drainage system 10, the lid 32 is configured to transition to the open position 62 to allow water to flow out of the pop-up emitter 22. The lid 32 may transition to the open position 62 in the event that the capacity of the water flowing through the water drainage system 10 is exceeded and the force of the water acting on the lid 32 in the water drainage system 10 causes the lid 32 to open.

The pop-up emitter 22 may further include a clip 64 that is secured to the turf cover 34. The clip 64 may be disposed within a second portion 66 of the slot 46 such that the clip 64 engages the pin 56 and retains the pin 56 within the first portion 58 of the slot 46. More specifically, the turf cover 34 and the clip 64 collectively extend about an outer periphery 68 of the pin 56 to secure the pin 56 within the slot 46, or more specifically to secure the pin 56 within the first portion 58 of the slot 46.

The turf cover 34 is disposed along a top side, a bottom side, and a front side of the pin 56 to secure the pin 56 within the slot 46. More specifically, the turf cover 34 has various surfaces that are disposed about and/or engage the outer periphery 68 of the pin 56 to secure the pin 56 within the slot 46. For example, upper surfaces 72, a lower surface 74, and front surfaces 76 define the first portion 58 of the slot 46. The upper surfaces 72 are configured to engage top sides of first and second opposing ends 70 of the pin 56, the lower surface 74 is configured to engage a bottom side of the pin 56 along a middle portion 78 of the pin 56, and the front surfaces 76 are configured to engage front sides of the first and second opposing ends 70 of the pin 56 to secure the pin 56 within the slot 46.

The clip 64 is disposed along a back side the pin 56 to engage and secure the pin 56 within the slot 46. A length $L_1$ and a width $W_1$ of the second portion 66 of the slot 46 may be greater than a length $L_2$ and a width $W_2$ of the pin 56, respectively, so that the pin 56 may slip downward into the second portion 66 of the slot 46. The pin 56 may then slide forward into the first portion 58 of the slot 46 where the upper surfaces 72, lower surface 74, and front surfaces 76 engage the pin 56 to trap the pin 56 within the first portion 58 of the slot 46. The clip 56 is then inserted into the second portion 66 of the slot 46 where the clip 64 is disposed along a back side the pin 56 to secure the pin 56 within the first portion 58 of the slot 46. Once the pin 56 is disposed within the first portion 58 of the slot 46 and the clip 64 is inserted into the second portion 66 of the slot 46, the outer periphery 68 of the pin 56 is completely surrounded securing the pin 56 within the first portion 58 of the slot 46.

The turf cover 34 has a protrusion 80 that extends outward from the central orifice 40 and is disposed below the slot 46. More specifically, the protrusion 80 may extend outward from the central orifice 40 along the conduit 38 portion of the turf cover 34. The protrusion 80 may define a bottom end of the slot 46 and may be disposed along the bottom end of the pin 56 to secure the pin within the slot 46. More specifically, a top surface of the protrusion 80 may also be the lower surface 74 that engages the bottom side of the pin 56 along the middle portion 78 of the pin 56.

The clip 64 may engage the protrusion 80 to secure the clip 64 to the turf cover 34. The clip 64 includes one or more hooks 82 that engage the protrusion 80 to secure the clip 64 to the turf cover 34. More specifically, the hooks 82 may engage a bottom surface 84 of the protrusion 80 to secure the clip 64 to the turf cover 34. The clip 64 includes a main body 86. The hooks 82 are each secured to the main body 86 via a biasing element 88 such that the hooks 82 are configured to flex outward and snap onto the protrusion 80 during installation.

The turf cover 34 may include support ribs 90 that are configured to increase the strength and stiffness of the turf cover 34. More specifically, the ribs 90 may extend radially outward from the conduit 38 to an outer edge 92 of the cover plate 42. The outer edge 92 of the cover plate may extend downward from the remainder of cover plate 42 so that outer edge 92 may also function as a rib to further increase the strength and stiffness of the turf cover 34. One of the ribs 90 may intersect and may be connected to the protrusion 80 in order to increase the strength and stiffness of the protrusion 80.

The lid 32 may include a flattened surface 94 that is configured to engage a top end of the clip 64 to limit rotation of the lid 32 relative to the turf cover 34 when the lid 32 is in the open position 62. More specifically, the top end of the clip 64 may act a stop that engages the flattened surface 94 for when the lid 32 is transitioned to the open position 62 such that the open position 62 is limited to relative angle θ between the lid 32 and the turf cover 74.

Figure 11:
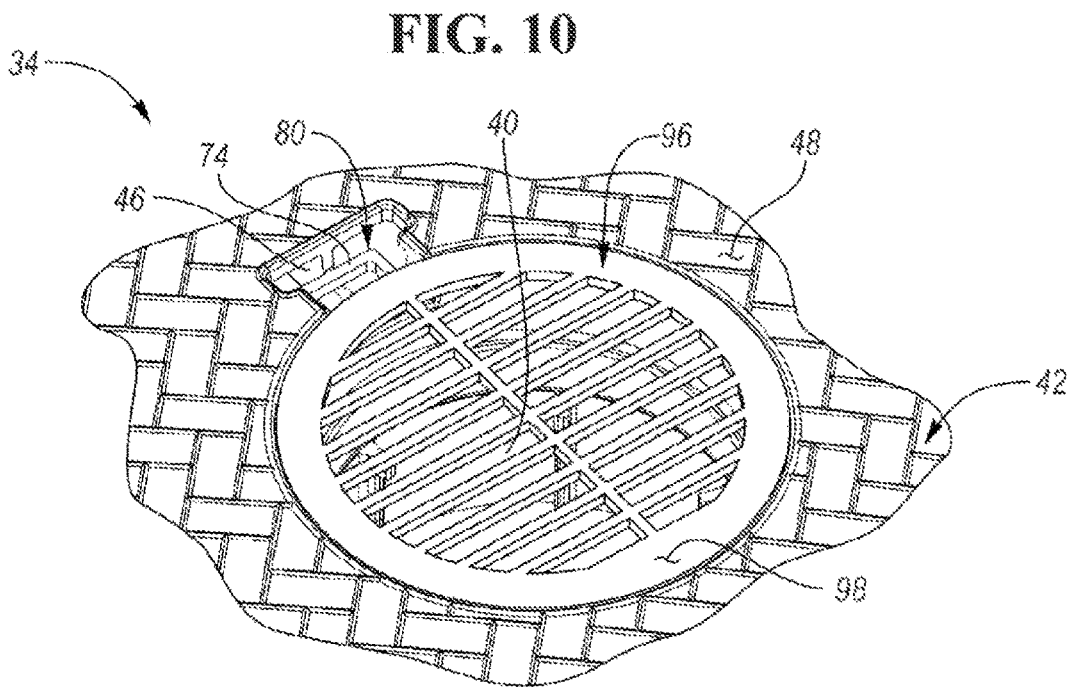
FIG. 11 is a top isometric view of the turf cover with the lid and retaining clip removed, and with a cover grate disposed on the turf cover in lieu of the lid.

Referring to FIG. 11, a grate 96 may be disposed over the central orifice 40 as opposed to the lid 32. The grate 96 may be interchangeable with the lid 32 and may be configured to engage the rim 50 to cover the central orifice 40. The grate 96 may shaped and sized similar to the lid 32 such that the grate 96 covers the entirety of the central orifice 40 and such that a top surface 98 of the grate 96 is flush with the top surface 48 of the turf cover 34. The lid 32, turf cover 34, clip 64, and the grate 96 may comprise a kit where the lid 32 and the grate 96 are interchangeable to meet the needs of different applications.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A pop-up emitter for a water drainage system comprising:
   a turf cover defining (i) a central orifice that is configured to establish fluid communication with a drainage conduit that is disposed below the pop-up drain emitter and (ii) a slot extending downward from a top surface of the turf cover;
   a lid (i) having a plate disposed over the central orifice along the top surface of the turf cover and (ii) a pin protruding outward from the plate, wherein the pin is disposed within a first portion of the slot, and wherein the plate is configured to pivot about the pin to transition between a closed position where the plate covers the central orifice and an open position where the central orifice is exposed such that water is emitted therefrom; and
   a clip (i) secured to the turf cover and (ii) disposed within a second portion of the slot such that the clip retains the pin within the first portion of the slot.

2. The pop-up emitter of claim 1, wherein the turf cover and clip collectively extend about an outer periphery of the pin at first and second opposing ends of the pin to secure the pin within the slot.

3. The pop-up emitter of claim 1, wherein the turf cover is disposed along a top side, a bottom side, and a front side of the pin to secure the pin with the slot.

4. The pop-up emitter of claim 3, wherein the clip is disposed along a back side of the pin to secure the pin with the slot.

5. The pop-up emitter of claim 1, wherein the turf cover has a protrusion that (i) extends outward from the central orifice and (ii) is disposed below the slot, and wherein the clip engages the protrusion to secure the clip to the turf cover.

6. The pop-up emitter of claim 5, wherein the clip includes at least one hook that engages the protrusion to secure the clip to the turf cover.

7. The pop-up emitter of claim 6, wherein the clip includes a main body, and wherein the at least one hook is secured to the main body via at least one biasing element such that the at least one hook is configured to flex outward and snap onto the protrusion during installation.

8. A pop-up emitter comprising:
   a conduit defining a flow channel configured to establish fluid communication with a drainage system;
   a cover plate (i) protruding radially outward from a top end of the conduit and about the flow channel and (ii) defining a slot along a top surface of the cover plate;
   a pop-up lid having a horizontally extending pin protruding outward therefrom, wherein (i) the pin is disposed within the slot, (ii) the pop-up lid is configured to pivot about the pin to transition between a first position where the plate covers the flow channel along the top end and a second position where the flow channel is exposed such that water is emitted therefrom; and
   a clip disposed within the slot and engaging the pin such that the clip retains the pin within the slot.

9. The pop-up emitter of claim 8, wherein the cover plate and clip collectively extend about an outer periphery of the pin at first and second opposing ends of the pin to secure the pin within the slot.

10. The pop-up emitter of claim 8, wherein the cover plate is disposed along a top side and a front side of the pin to secure the pin with the slot.

11. The pop-up emitter of claim 10, wherein the clip is disposed along a back side of the pin to secure the pin with the slot.

12. The pop-up emitter of claim 11, wherein the conduit has a protrusion that (i) extends outward from the flow channel and (ii) is disposed below the slot, and wherein the protrusion is disposed along a bottom of the pin to secure the pin with the slot.

13. The pop-up emitter of claim 8, wherein the conduit has a protrusion that (i) extends outward from the flow channel and (ii) is disposed below the slot, and wherein the clip engages the protrusion to secure the clip to the conduit.

14. The pop-up emitter of claim 13, wherein the clip includes hooks that engage the protrusion to secure the clip to the conduit.

15. The pop-up emitter of claim 14, wherein the clip includes a main body, and wherein the hooks are secured to the main body via biasing elements such that the hooks are configured to flex outward and snap onto the protrusion during installation.

16. A pop-up emitter kit comprising:
   a turf cover defining (i) a central orifice, (ii) defining a slot extending downward from a top surface of the turf cover, and (iii) having a rim that extends about an outer periphery of the central orifice and is recessed from an upper surface of the turf cover;
   a lid having a pin protruding outward therefrom, wherein (i) the pin is configured to be disposed within a first portion of the slot, (ii) the lid is configured to engage the rim and cover the central orifice when in a closed position, and (iii) the lid is configured to rotate via the pin from the closed position to an open position such that the lid disengages the rim and exposes the central orifice so that water is emitted therefrom;
   a clip configured to be disposed within a second portion of the slot and engage the pin to retain the pin within the first portion of the slot; and
   a grate interchangeable with the lid and configured to engage the rim to cover the central orifice.

17. The pop-up emitter kit of claim 16, wherein the turf cover has a protrusion that (i) extends outward from the central orifice and (ii) is disposed below the slot.

18. The pop-up emitter kit of claim 17, wherein the clip is configured to engage the protrusion to secure the clip to the turf cover.

19. The pop-up emitter kit of claim 17, wherein the clip includes at least one hook configured to engage the protrusion to secure the clip to the turf cover.

20. The pop-up emitter kit of claim 19, wherein the clip includes a main body, and wherein the at least one hook is secured to the main body via at least one biasing element such that the at least one hook is configured to flex outward and snap onto the protrusion during installation.

* * * * *